United States Patent
Lelkes

(10) Patent No.: US 8,120,298 B2
(45) Date of Patent: Feb. 21, 2012

(54) CONTROL UNIT FOR AN ELECTRIC MOTOR, IN PARTICULAR FOR A FAN MOTOR

(75) Inventor: Andras Lelkes, Bad Durrheim (DE)

(73) Assignee: Papst Licensing GmbH & Co. KG, St. Georgen (DE)

( * ) Notice: Subject to any disclaimer, the term of this patent is extended or adjusted under 35 U.S.C. 154(b) by 643 days.

(21) Appl. No.: 12/299,426

(22) PCT Filed: May 3, 2007

(86) PCT No.: PCT/EP2007/054301
§ 371 (c)(1),
(2), (4) Date: Nov. 3, 2008

(87) PCT Pub. No.: WO2007/128772
PCT Pub. Date: Nov. 15, 2007

(65) Prior Publication Data
US 2009/0091279 A1    Apr. 9, 2009

(30) Foreign Application Priority Data
May 4, 2006    (DE) .................... 20 2006 007 136 U

(51) Int. Cl.
H02H 7/08    (2006.01)
(52) U.S. Cl. ................ 318/400.21; 318/400.22
(58) Field of Classification Search ............. 318/400.21, 318/400.22, 461, 599, 811
See application file for complete search history.

(56) References Cited

U.S. PATENT DOCUMENTS

| | | | |
|---|---|---|---|
| 3,778,696 A * | 12/1973 | Walters et al. ................ | 318/565 |
| 5,023,531 A | 6/1991 | Altemose et al. | |
| 5,410,230 A * | 4/1995 | Bessler et al. ................ | 318/471 |
| 5,744,921 A * | 4/1998 | Makaran .................. | 318/400.34 |
| 6,713,977 B1 * | 3/2004 | Sutter et al. ............. | 318/400.03 |
| 6,791,209 B2 * | 9/2004 | Aldridge et al. ............... | 307/65 |
| 6,862,163 B2 | 3/2005 | Schierling et al. | |

FOREIGN PATENT DOCUMENTS

| | | |
|---|---|---|
| EP | 1 364 825 A | 11/2003 |
| EP | 1364825 | 11/2003 |
| WO | WO03/009457 | 1/2003 |
| WO | WO-03/009457 A | 1/2003 |

OTHER PUBLICATIONS

European Office Action—Application No. 07 728 754.8; Dated Oct. 12, 2009.
European Patent Application No. 07728754.8-2007; English translation of Official Communication from the European Patent Office.

(Continued)

*Primary Examiner* — Rina Duda
(74) *Attorney, Agent, or Firm* — McCracken & Frank, LLC

(57) ABSTRACT

The invention provides a control unit for at least one electric motor, wherein the control unit performs open-loop or closed-loop control of the motor speed of the electric motor in such a way that in the case of control values in specific ranges which are typical of a fault when the setpoint value is being predefined, such a fault being, for example, a line break, a voltage failure or a short circuit, the control unit drives the motor with a predefined setpoint value which differs from the current control value.

18 Claims, 7 Drawing Sheets

OTHER PUBLICATIONS

European Patent Application No. 07728754.8-2007; Response to the Official Communication from Oct. 12, 2009 according to article 94(3) EPC.
International Search Report based on PCT/EP2007/054301; Date of Mailing: Jun. 29, 2007.
International Search Report in corresponding PCT/EP2007/054301 dated Jun. 29, 2007.
Written Opinion in corresponding PCT/EP2007/054301.
International Preliminary Report on Patentability in corresponding PCT/EP2007/054301 Aug. 7, 2008.

* cited by examiner

CONTROL UNIT FOR AN ELECTRIC MOTOR, IN PARTICULAR FOR A FAN MOTOR

CROSS-REFERENCE TO RELATED APPLICATION

The present application claims the benefit of priority of International Patent Application No. PCT/EP2007/054301, filed on May 3, 2007, which application claims priority to German Patent Application No. 20 2006 007 136.9, filed May 4, 2006. The entire text of the priority application in incorporated herein by reference in its entirety.

DESCRIPTION

The invention relates to a control unit for an electric motor. Such control units are used to perform open-loop or closed-loop control of the motor speed. In many cases, in particular in fan applications, the motor speed is lowered according to demand in order to reduce the consumption of electric power. In the case of a fan, not only the power demand but also the flow noise are highly dependent on the motor speed. FIG. 1 shows the shaft power output of the fan motor (1) and the flow noise of the fan (2) as a function of the motor speed. The torque demand of a fan wheel increases to the power of two of the motor speed. As a result, the shaft power output of the motor even increases to the power of three of the motor speed. This means that, for example, at half the motor speed the output power of the motor only reaches 12.5% of the rated power. The shaft power output even drops below 1% if the motor speed is less than 21.5% of the rated motor speed. The flow noise (2) has been found empirically to drop to 15-17 dB(A) when the motor speed is halved.

In addition to the energy demand, the noise can therefore also be significantly reduced if motor-speed-controlled fan motors are used and if open-loop control of the motor speed and therefore of the air line is performed according to demand. The motor speed of a fan can be influenced in different ways as a function of the types of motor used. In the case of direct current motors, open-loop control of the motor speed is performed by means of the motor voltage. The control unit can predefine the motor voltage with a clocked voltage converter (chopper) or by means of a controlled rectifier. For universal motors, the amplitude of the alternating voltage can be set by means of a phase angle controller. In the case of a brushless motor (also referred to as BLDC or electronically commutated motor, referred to as EC motor), the control unit performs the electronic commutation. The control unit can additionally influence the motor voltage and as a result the motor speed through corresponding clocking of the transistors in the commutation electronics. In the case of asynchronous motors, either the frequency and the amplitude of the motor voltage are predefined with a frequency converter, or in the case of cost-effective systems, in particular in the case of fan drives, only the motor voltage is changed, for example, by means of a phase angle controller (referred to as slip controller).

The desired motor speed is usually defined by means of superimposed open-loop control. The setpoint value of the motor speed is often transmitted with an analogue value (for example 0-10 V) or with a pulse-width-modulated, digital value (PWM). FIG. 2 shows an input characteristic which is typical of fan applications. In this example, the superimposed controller has to output 0-10% of the control signal (x) for the motor to be stationary (nsetp=0). A disadvantage of this method is that in the case of faults, for example in the case of a line break or a short circuit in the control line, the fan can stop. In this case, it is not possible to ensure sufficient cooling, which may lead to a failure of the system. As a result, considerable material damage may occur and large losses due to a failure of production.

SUMMARY OF THE INVENTION

The present invention is therefore based on the object of configuring the input characteristic of the control unit in such a way that in the case of such a fault the motor continues to operate with a predefined motor speed. In the case of a fault such as a line break or a short circuit in the control line or in the case of the failure of the superimposed controller, the probability is high that the control signal x will record the value 0% or 100%.

According to the invention, the customary input characteristic is therefore changed according to FIG. 2 in such a way that in the case of input values in specific ranges, primarily approximately 0% or 100%, the controller drives the motor with a predefined setpoint value which differs from the current setpoint value.

In one advantageous embodiment, the controller additionally outputs a warning in the case of such a fault. This warning can be output by means of a visual or audible signal, by means of an analogue or digital electronic signal or by means of a commutation bus, for example, CAN bus.

DETAILED DESCRIPTION OF THE INVENTION

Figure 1:
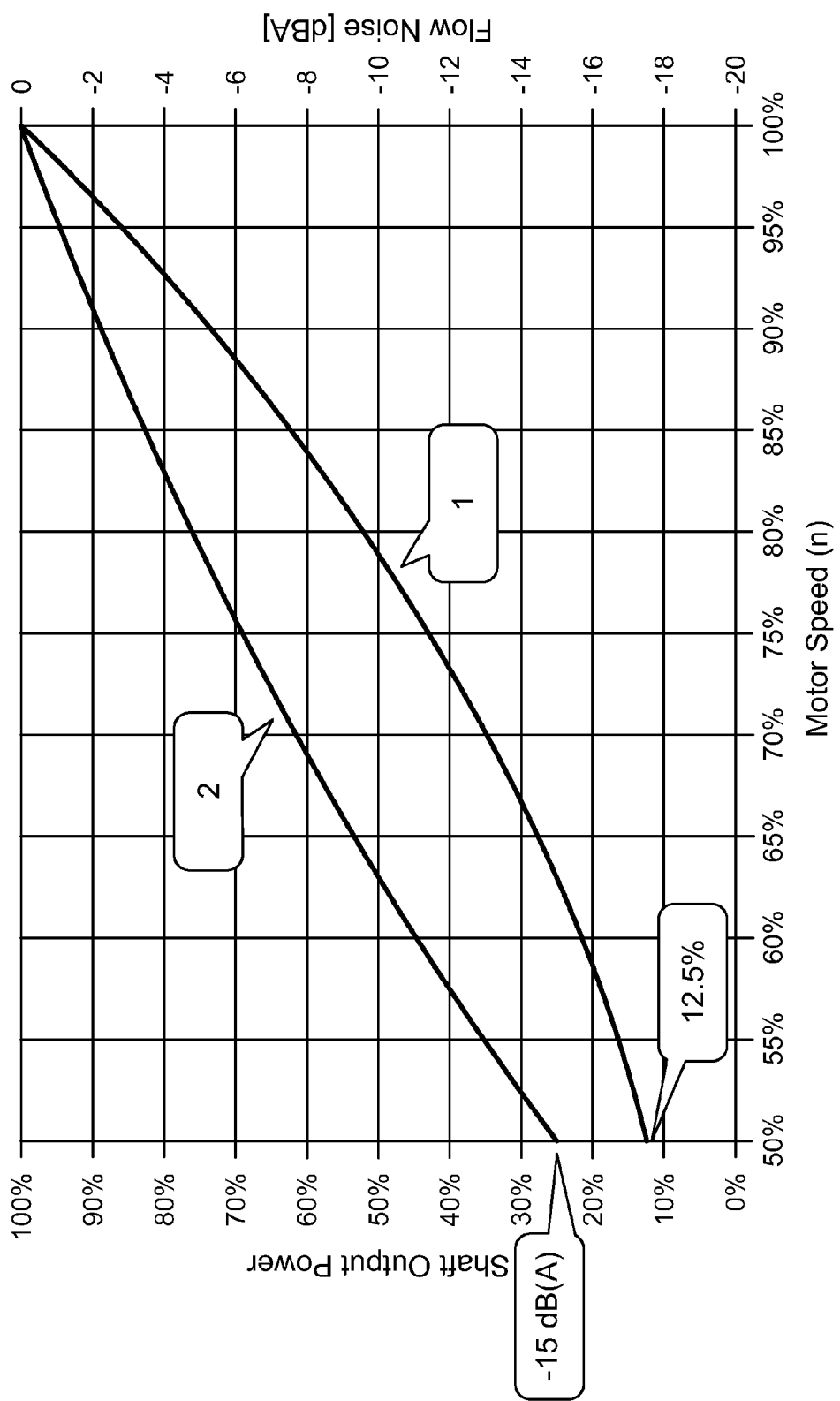
FIG. 1 shows the shaft output power of the fan motor and the flow noise of the fan as a function of the motor speed.
Figure 2:
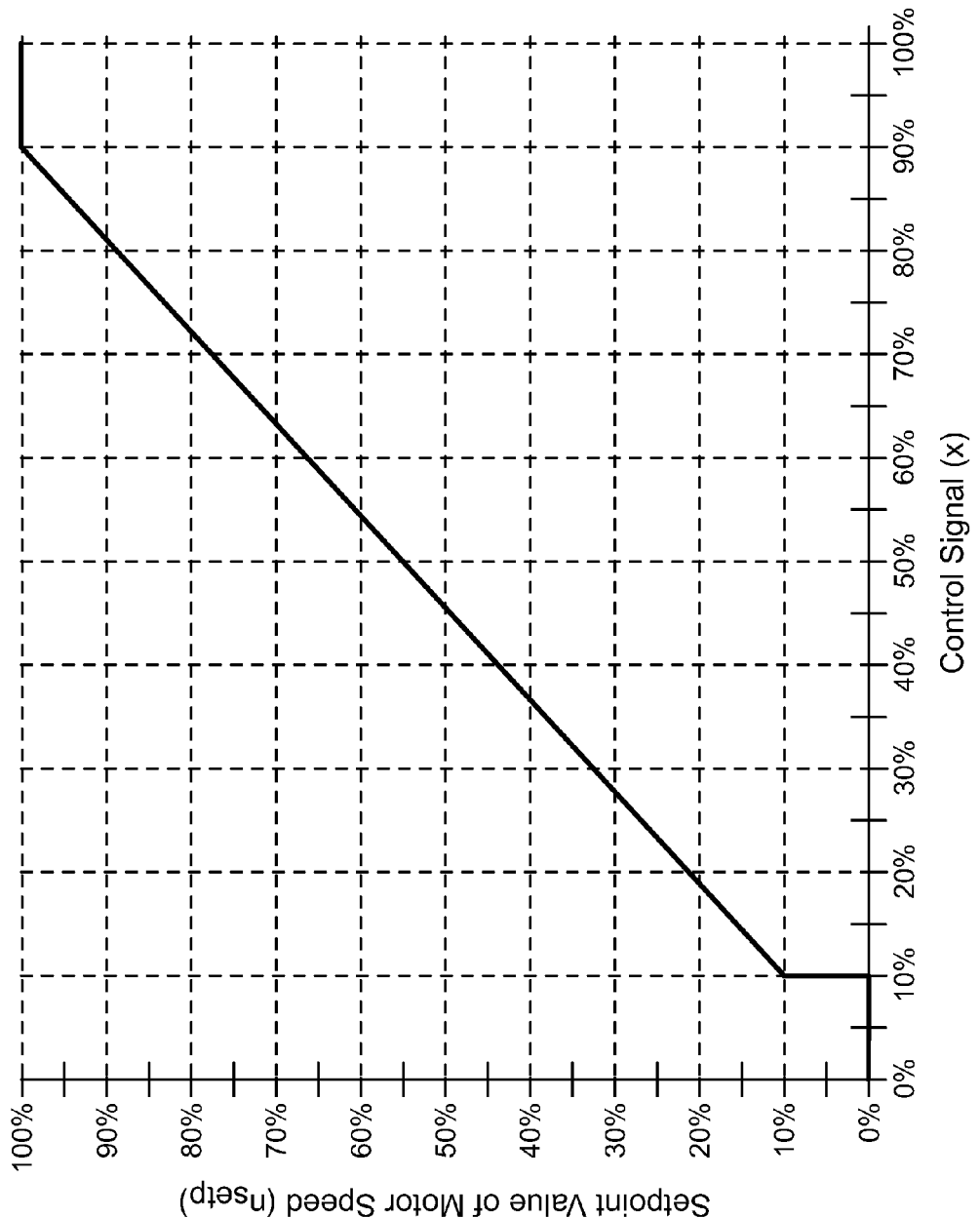
FIG. 2 shows an input characteristic which is typical of fan applications.
Figure 3:
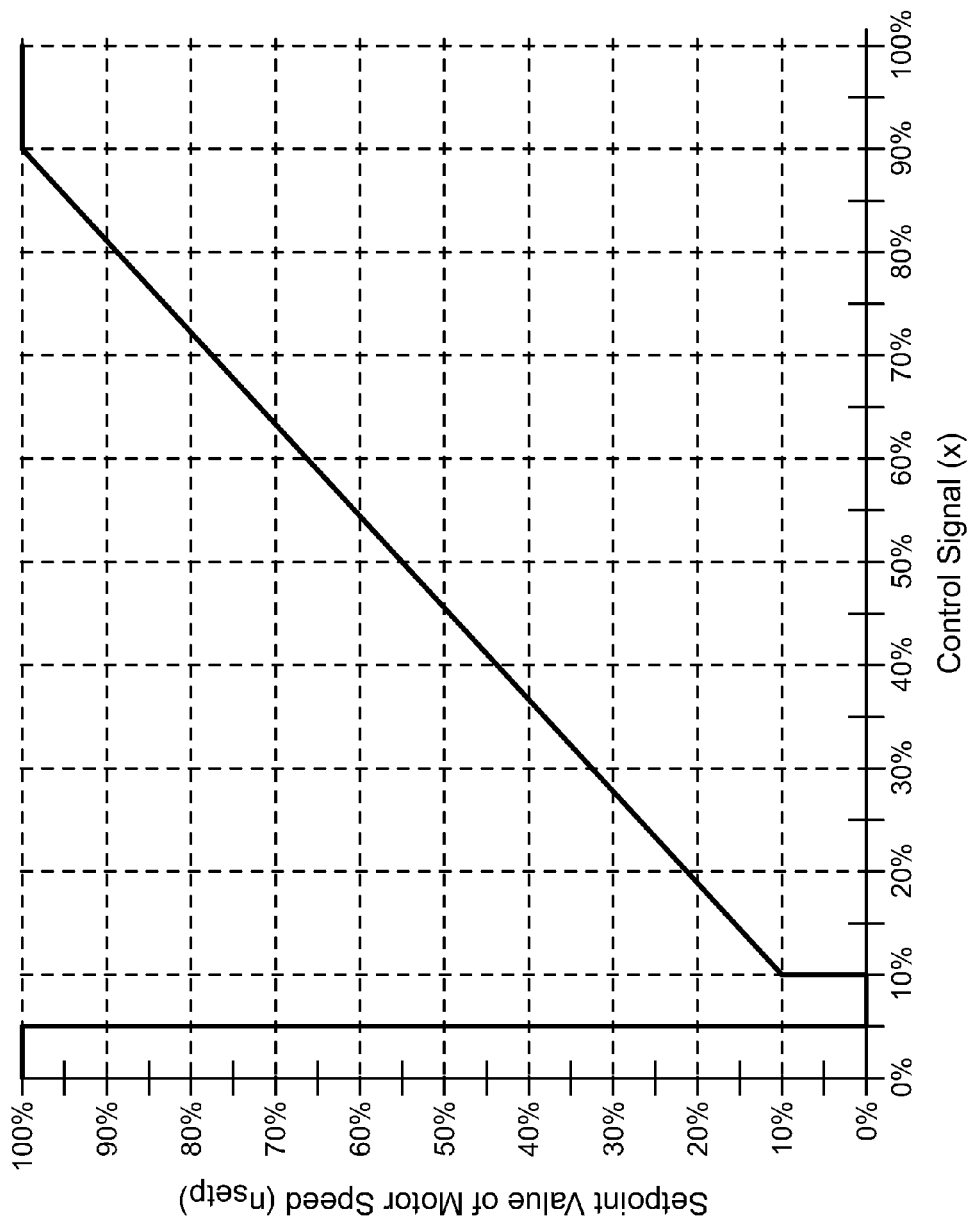
FIG. 3 shows the input characteristic of the control unit in an advantageous embodiment.

FIG. 3 shows the input characteristic of the control unit in an advantageous embodiment. In this example, the superimposed controller must output 5-10% of the control signal (x) instead of 0-10% in order to stop the motor. In the case of an analogue control signal (0-10 V) this means that in the case of a control voltage of 0.5 V to 1 V the motor is stationary (nsetp=0). A control voltage of less than 0.5 V indicates a fault (for example a failure of the superimposed controller, a line break or a short circuit in the control line). When a setpoint value is predefined with a PWM controlled digital signal, the motor will be stationary given a control signal of 5 to 10% PWM. A PWM factor of less than 5% means a fault. This is the case, for example, if the control signal is continuously at a low level (corresponds to 0% PWM). In this case, a predefined setpoint value of the motor speed is used. In FIG. 3, this value is for the fault nsetp=100%. For applications such as, for example, with fans, reliable operation is therefore ensured even in the case of a fault in the transferring of setpoint values. Although in fan applications, the power and noise are not reduced when such a fault occurs, sufficient cooling is ensured.

Figure 4:
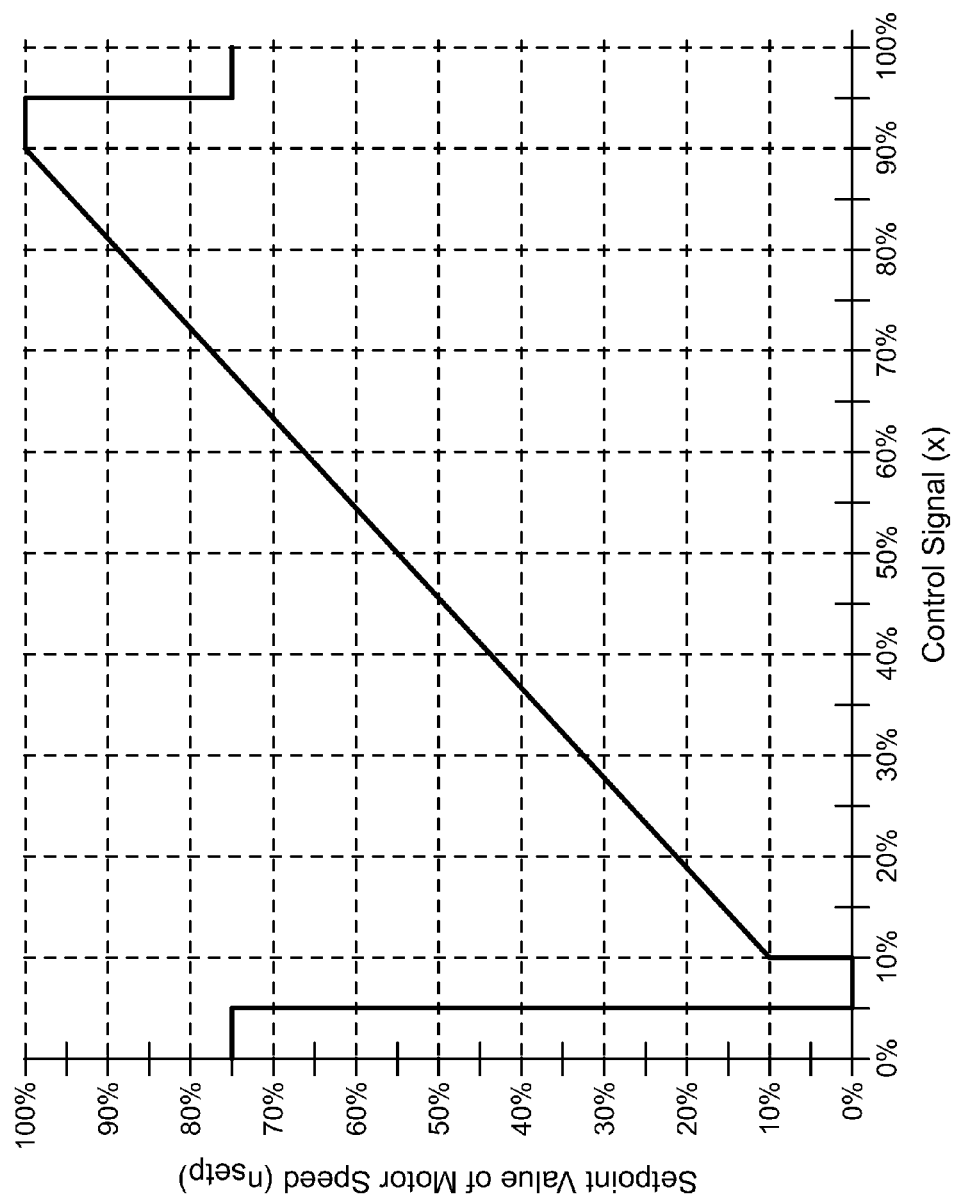
FIG. 4 shows the inventive input characteristic of the control unit if a setpoint value of nsetp=75% is used when such a fault is detected.

A setpoint value which differs from the maximum (100%) setpoint value of the motor speed can also be used in the event of a fault. In some cases, a reduced motor speed is sufficient for cooling in a normal situation, and the maximum motor speed (100%) is provided only for specific exceptional situations, for example for the failure of one of the fans which operate in parallel. FIG. 4 shows the inventive input characteristic of the control unit if a setpoint value of nsetp=75% is used for the detected fault. This value is therefore used if the control signal assumes x values in the ranges 0-5% and 95%-100%.

Figure 5:
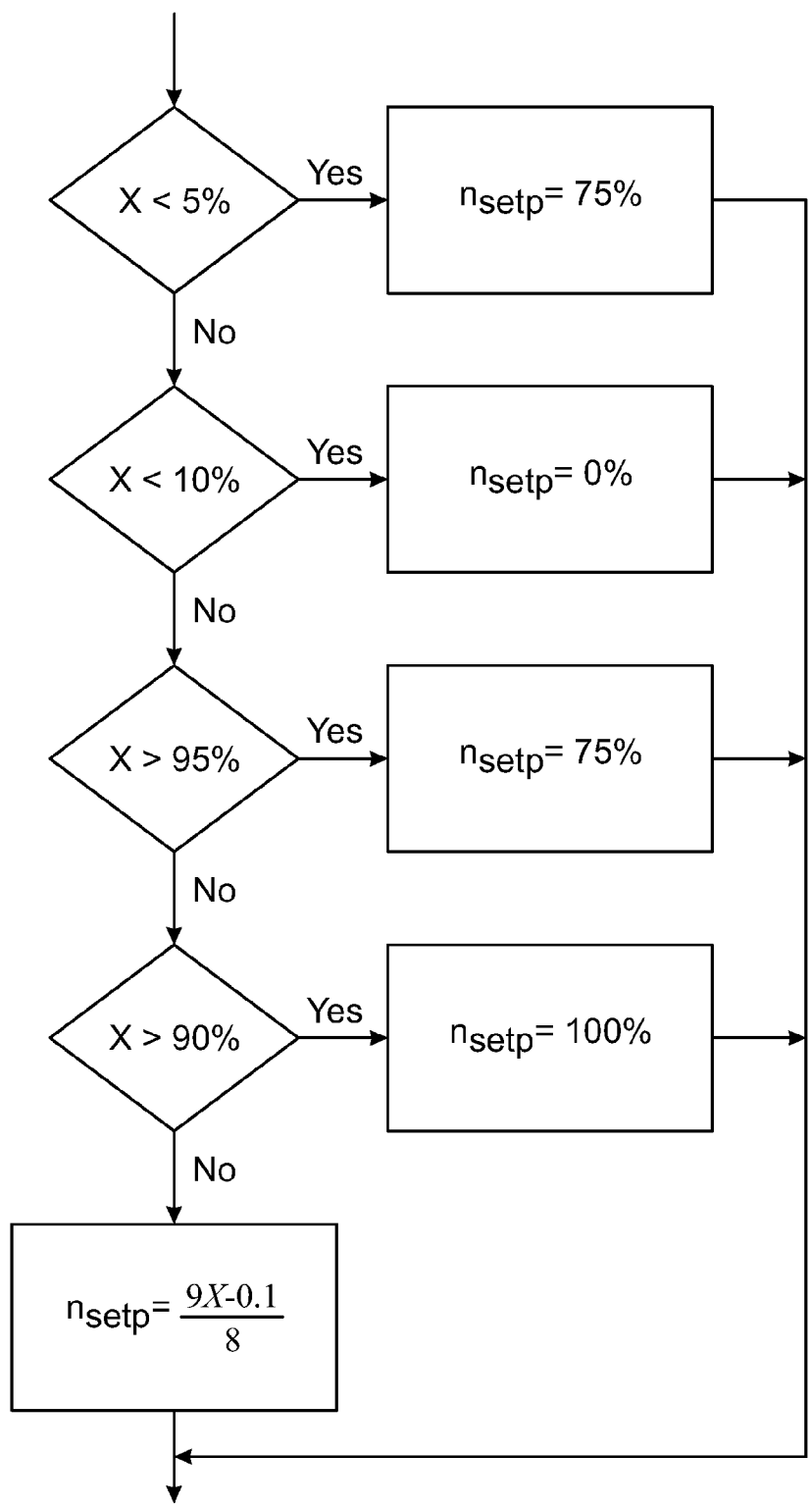
FIG. 5 shows the program sequence for implementing the input characteristic curve.

In order to implement an input characteristic curve according to FIG. 4, the analogue control signal can firstly be converted into a digital value using an analogue/digital converter. The signal is then further processed in digital form. In one advantageous refinement of the invention, this can be carried out by means of a programmable component such as a microprocessor, digital signal processor (DSP) or microcontroller. The program sequence for implementing the input characteristic curve is illustrated in FIG. 5.

Figure 6:
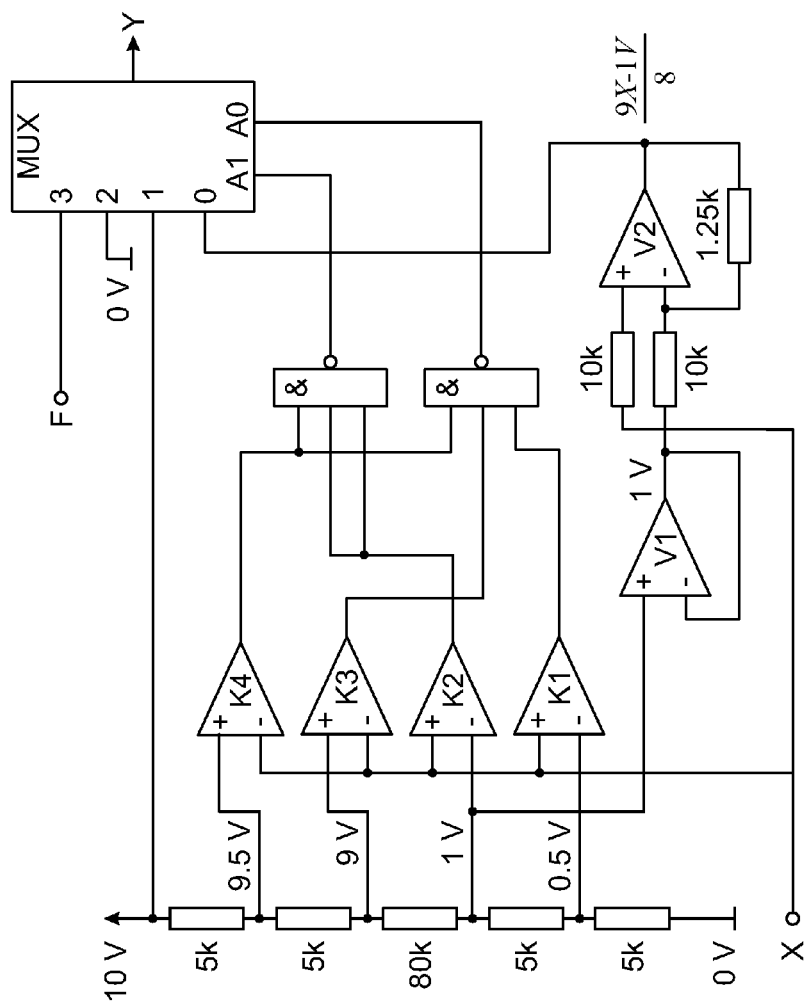
FIG. 6 shows a exemplary circuit.

In a further refinement of the invention, the input characteristic curve is implemented using an electronic analogue circuit. FIG. 6 shows an exemplary circuit for this. This circuit is composed of four analogue comparators (K1 to K4), two operational amplifiers (V1, V2), two digital NAND gates, and of an analogue multiplexer (MUX). The comparators compare the control signal X with the voltage values at the discontinuities in the input characteristic according to FIG. 4, that is to say with 0.5 V, 1 V, 9 V and 9.5 V. These voltages are produced here from the 10 V supply voltage with a resistor series. The output signals of the comparators are further processed with the NAND gates and control the analogue multiplexer, as is shown by the following table.

TABLE 1

| Control signal X | K4 | K3 | K2 | K1 | A1 | A0 | Y |
|---|---|---|---|---|---|---|---|
| 0 ... 0.5 V | 1 | 1 | 0 | 0 | 1 | 1 | F |
| 0.5 ... 1 V | 1 | 1 | 0 | 1 | 1 | 0 | 0 V |
| 1 ... 9 V | 1 | 1 | 1 | 1 | 0 | 0 | $\frac{9X-1\,V}{8}$ |
| 9 ... 9.5 V | 1 | 0 | 1 | 1 | 0 | 1 | 10 V |
| 9.5 ... 10 V | 0 | 0 | 1 | 1 | 1 | 1 | F |

F is here the predefined setpoint value for the fault. If this value is, for example, 75%, as in FIG. 4, 7.5 V has to be connected here.

Figure 7:
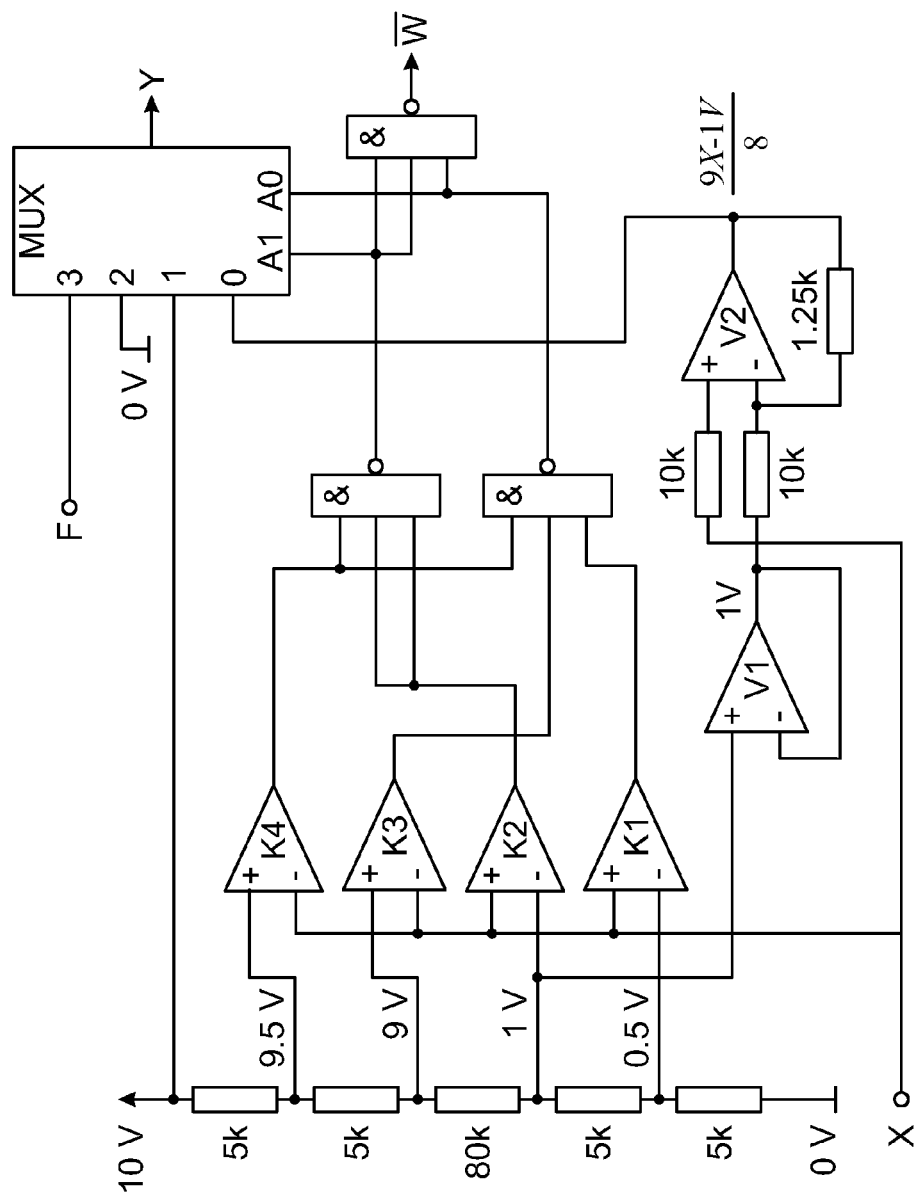
FIG. 7 shows a further exemplary circuit with a warning output.

This circuit can be supplemented with a warning output (W), as illustrated in FIG. 7. In a normal situation this output supplies a logic "1" and in the case of a fault it supplies a logic "0". This warning is output if the control signal X assumes values lower than 0.5 V or higher than 9.5 V.

The control unit according to the invention can form a separate unit or can be integrated into the motor housing or into the terminal box of the motor so that motor and control unit form one mechanical unit. The solution according to the invention can also advantageously be used in compact fans where control unit and motor are integrated parts of the compact fan. The solution according to the invention can, however, be used not only in fans, blowers and pumps but also in any application in which in the event of a fault it is more favourable to operate the motor with a predefined motor speed than to switch off the motor. Correspondingly, the invention is not only limited to the illustrated and described exemplary embodiments but rather also comprises all embodiments of like effect within the sense of the invention.

As one example, a brushless DC motor that incorporates aspects of the invention disclosed herein can be used to spin one or more hard disks in operative relation to at least one read/write head inside of a clean room environment that is manufactured to HDD industry contamination standards. As another example, the motors disclosed herein can be used to move storage media in other information storage devices such as, for example, an optical disk drive, a magneto-optical disk drive, a tape drive or a VCR.

The invention claimed is:

1. A device, comprising:
    a brushless DC motor including at least one winding and a permanent magnetic rotor mounted for rotation about an axis;
    a load member connected to the rotor for rotation about the axis;
    a control circuit operatively coupled to the at least one winding to selectively provide current to the at least one winding and thereby cause both the rotor and the load member to rotate about the axis; and
    wherein the control circuit provides the current in response to a control value such that:
    if the magnitude of the control value is in a range of values associated with a fault condition, the control circuit sets the current to a predetermined value, wherein the rotor and the load member rotate at a nonzero speed in response to the current, and
    if the magnitude of the control value is between a nonzero first threshold value and a second threshold value greater than the first threshold value, the control circuit stops rotation of the rotor and the load member.

2. The device of claim 1, wherein the range of values associated with a fault is a range from zero to the first threshold value.

3. The device of claim 1, wherein the control value is one of a pulse-width modulated signal and a voltage.

4. The device of claim 1, wherein the control circuit outputs a warning if the control value indicates a fault.

5. The device of claim 1, wherein the control value is an analog voltage signal and the control value indicates a fault if the control value is a signal voltage that is zero or identical to a supply voltage.

6. The device of claim 1, wherein the control value is a modulated digital signal and the control value indicates a fault if the modulated digital signal has a modulation of 0% or 100%.

7. The device of claim 1, wherein the current is a setpoint value associated with the motor and predetermined value is a maximum setpoint value.

8. The device of claim 1, wherein the motor is commutated electronically, and the control circuit performs the function of the electronic commutation.

9. The device of claim 1, wherein the motor drives a fan or a pump.

10. The device of claim 1, wherein the control circuit forms a mechanical unit with the motor.

11. The device of claim 10, wherein the control circuit is integrated into a housing for the motor.

12. The device of claim 10, wherein the control circuit is integrated into a terminal box of the motor.

13. The device of claim 10, wherein the control circuit and the motor are parts of a compact fan.

14. The device of claim 1, wherein the current is a setpoint value that operates with an electronic analog circuit.

15. The device of claim 1, wherein the control value is converted into a digital value using an analog-to-digital converter and the control value is further processed in digital form.

16. The device of claim 15, wherein the digital value is processed with a programmable component.

17. The device of claim 16, wherein the programmable component is at least one of a microprocessor, digital signal processor, and a microcontroller.

18. The device of claim 1, wherein the first threshold value is one of 0.5 volts and 5% modulation and the second threshold value is one of 1 volt and 10% modulation.

* * * * *